(12) United States Patent
Agarwal et al.

(10) Patent No.: US 9,420,417 B1
(45) Date of Patent: *Aug. 16, 2016

(54) FACILITATING LOCATION-BASED COMMUNICATION WITH MOBILE DEVICES

(71) Applicant: International Business Machines Corporation, Armonk, NY (US)

(72) Inventors: Kanak B. Agarwal, Austin, TX (US); Patrick J. Bohrer, Austin, TX (US); Ahmed Gheith, Austin, TX (US); Michael D. Kistler, Austin, TX (US); Ramakrishnan Rajamony, Austin, TX (US); Brian L. White Eagle, Austin, TX (US); James Xenidis, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,918

(22) Filed: Sep. 7, 2015

(51) Int. Cl.
*H04W 4/02* (2009.01)
*H04W 64/00* (2009.01)
*H04M 3/38* (2006.01)
*H04L 12/24* (2006.01)

(52) U.S. Cl.
CPC ............... *H04W 4/02* (2013.01); *H04W 64/00* (2013.01); *H04L 41/5054* (2013.01); *H04M 3/38* (2013.01)

(58) Field of Classification Search
CPC ......... H04W 4/02; H04W 64/00; H04W 4/16; H04W 4/023; H04W 4/025; H04W 40/20; H04W 76/002; H04W 48/04; H04W 4/028; H04W 8/205; H04L 67/18; H04L 41/5054; H04M 1/72572; H04M 3/38; H04M 3/562; H04M 3/565; G01S 5/0027

See application file for complete search history.

(56) References Cited

U.S. PATENT DOCUMENTS

| | | | | |
|---|---|---|---|---|
| 2007/0099609 | A1* | 5/2007 | Cai | ...................... H04L 41/5054 455/428 |
| 2010/0211446 | A1* | 8/2010 | Ray | ........................ G06Q 30/02 705/14.19 |
| 2010/0279666 | A1* | 11/2010 | Small | ..................... H04M 1/576 455/414.1 |
| 2011/0249658 | A1* | 10/2011 | Wohlert | .................. H04W 4/04 370/338 |
| 2013/0078943 | A1* | 3/2013 | Biage | .................. H04M 3/5116 455/404.2 |

OTHER PUBLICATIONS

Appendix P.

* cited by examiner

*Primary Examiner* — Nizar Sivji
(74) *Attorney, Agent, or Firm* — Garg Law Firm, PLLC; Rakesh Garg; William J. Stock

(57) ABSTRACT

An instruction for making a call to a location is received at an application executing in a service provider system. The location is a place where different callees with different mobile devices are present at different times, and a callee is present with a mobile device at the place at a given time therefore the call is made to the mobile device of the callee in order to call the location. Using the application, a set of locations corresponding to a set of subscribers is detected. From the set of subscribers, a set of potential callees is identified. Each mobile device associated with each callee in the set of potential callees is present at the location at the given time. Using the application, the call is established between a caller's device and the mobile devices of a subset of potential callees, the subset of potential callees including the callee.

20 Claims, 8 Drawing Sheets

FACILITATING LOCATION-BASED COMMUNICATION WITH MOBILE DEVICES

TECHNICAL FIELD

The present invention relates generally to a method, system, and computer program product for facilitating telecommunications with mobile devices. More particularly, the present invention relates to a method, system, and computer program product for facilitating location-based communication with mobile devices.

BACKGROUND

Mobile devices are usable for telecommunications, and proliferate all aspects of daily life. Users with mobile devices frequently travel to a variety of places for a variety of purposes. It is conceivable that regardless of what or where a place might be, if there is a human user in that place, it is very likely that the user has a mobile device on the user's person or otherwise available to the user with which to establish a telecommunications call (hereinafter, "call").

A call is any suitable method of telecommunication, including but not limited to audio telephonic communications, video telecommunications, textual messaging, taptically or haptically telecommunicating information, and generally telecommunication of data in these and other forms. Any type of mobile device can be used for a call. A mobile device is capable of relocating from one location to another as a user associated with the mobile device moves from one location to another. As some non-limiting examples, the mobile device can take the form of a cellular phone, a smartphone device, a tablet computer, a portable computing platform, a wearable device, and the like.

A typical call begins with a calling user (hereinafter, "caller") dialing the number associated with a mobile device associated with a called user (hereinafter, "callee"). The service provider connects the call between the caller's telecommunication device and the callee's mobile device. In some cases, the caller selects a callee's name, such as from a phonebook or a similar contacts management application, and the caller's device calls the number stored relative to the callee's name in the phonebook.

In some cases, a caller may not know the callee or a callee's number. A caller can use a directory service, whereby the caller identifies the intended callee by name, address, or both, and the directory service provides the callee's number to the caller, connects the call between the caller and the callee, or both.

The illustrative embodiments recognize that for the directory service to work using only the address, the callee's number has to be permanently associated with that address, even if the number is assigned to a mobile device. In other words, if a callee has to be reached only by knowing the callee's address, the callee's number must be unchangeably associated with the address, even if the device associated with the number is mobile.

The illustrative embodiments recognize that presently, there is no available method by which a caller could call any callee who may be present at a given location at a given time. In other words, if a caller were interested in calling anyone who may be present at or around a specified geographical location, during a given period, the caller will be able to call that location only if either a number is permanently associated with that location and the caller calls that number, or the caller calls a specific known callee whose presence at the location might be a known fact to the caller.

The illustrative embodiments recognize that such a deficiency in the present telecommunications systems are severely limiting in many circumstances. The illustrative embodiments recognize that under certain circumstances, a caller may want to call any callee who satisfies a location-related criterion. A location-related criterion is a criterion or condition, which may specify a location, or from which a location can be deduced, and which must be satisfied by a potential callee. In other words, a location-related criterion can be used to deduce a present, past, or future location of a potential callee, qualify the callee for participation in the call, or both.

For example, a caller might want to call anyone —even an unknown callee—who may be at the park now, to ask whether they see a child with a red sweater on the swing there. The park may not have a number associated therewith, and different callees may be present at the park at different times. The callee's presence at a location —the park—is an example of a callee condition in a location-related criterion that the callee has to satisfy to participate in the call, and where the park is a location specified in the criterion.

As another example, a caller might want to call anyone—even an unknown callee—who may be near a store, to ask whether the store has a line of patrons outside. The callee's presence at a location—near the store, e.g., within certain distance of the store—is another example of a location-related criterion where the store may be specified but "near" the store may be an unspecified location in the location-related criterion. The "near the store" location may not have a number associated therewith, or even an address associated therewith. Furthermore, the "near the store" may not be a specific location but an area, such as an area defined by a radius or other geographical fence. Additionally, different callees, with different mobile devices, and with different numbers or identifiers, may be present in the area at different times.

As another example, a caller might want to call anyone—even an unknown callee—if certain other types of location-related conditions or criteria are met by the callee, to exchange some information. For example, the caller might be interested in calling someone who is stationary, i.e., not driving or being driven, and ask the callee about a landmark that is visible from the callee's location. The callee being stationary at the callee's location is another example of a callee condition in a location-related criterion, which the callee has to satisfy to participate in the call. The callee's location may or may not be specified in the location-related criterion, and therefore may have to be deduced from the location-related condition. As in the other examples above, different callees, with different mobile devices, and with different numbers or identifiers, may be present at the callee's location at different times.

As another example, the caller might be interested in calling someone who is in a group of ten people or more, with a known person, such as a well known performer whose present location is available. The callee's presence with a group is another example of a callee condition in the location-related criterion, which the callee has to satisfy to participate in the call. The location of the group is unspecified in the location-related criterion but can be deduced from the location of the performer. Again, different callees, with different mobile devices, and with different numbers or identifiers, may be present with the known person at different times.

As another example, the caller might be interested in calling anyone who is situated so as to be able to reach a location within a given amount of time. The callee's presence at one location—from where another location is reachable—is an example of a location-related criterion, where the other location may or may not be specified, as in the above examples. Specifically, a callee condition in this example may include the reachability of the other location. For example, if the other location is two miles away, a pedestrian callee may not satisfy the callee condition whereas a driver callee might, depending upon a trajectory of the driver callee's path from the driver callee's present location. The other location may be specified or deduced from the location-related condition. Again, different callees, with different mobile devices, and with different numbers or identifiers, may be within such a distance from the location at different times.

As another example, the caller might be interested in calling more than one callee who is located in an area or location during a given period. Particularly, the caller may want at least n callees to respond, no more than n callees to respond, n or more callees to respond, or some combination thereof. Furthermore, the caller may want one or more responses within a given period. Not only could different callees, with different mobile devices, and with different numbers or identifiers, be present at the location during the period, but also the group of potential callees may change during the period as callees enter and leave the area.

As another example, the caller might be a member of a household who may be interested in calling, at a future time, anyone who is situated at a location with another member of the household at a future time so as to be able to give a message or otherwise interact with the other member of the household at that future time. For example, such a situation may arise when the other member has forgotten his mobile phone and is not stationary at a predetermined location. The location of the other member of the household can be determined using a suitable mechanism other than a mobile device associated with the other member. For example, the other member's location is determinable at a store when the other member uses his credit card to make a purchase at the store. The callee may be another patron at the store. The callee's co-location with the other member of the household is an example of a location-related criterion and a future time based condition. Again, different callees, with different mobile devices, and with different numbers or identifiers, may be at the location at different times.

As another example, the caller might be interested in calling anyone near a lost pet to catch or corral the pet. The pet's location may be determined by a tracker in the pet's collar and the like. Because the pet is loose, the caller is interested in reaching different callees at different times according to the future travel path of the lost pet on an ongoing basis until the pet is captured. The callee's co-location near a future location of the pet at a future time is an example of a location-related criterion and a future time based condition. Again, different callees, with different mobile devices, and with different numbers or identifiers, may be at those different future locations at different times.

A similar situation can arise with a lost child or with a lost item in a public transportation vehicle as well. Another example situation where a caller wants to call any callee who is present at a time and location where the umbra of a solar eclipse will cross the United States border is a similar situation. The location and time of the umbra crossing the border has to be deduced from other data, and at that time a location call to that location has to be placed in a manner described herein.

As another example, a caller might want to call anyone—even an unknown callee—who may be at a location that the caller visited earlier, to ask whether they see the caller's lost wallet there. The past location is of the caller, the condition is a present presence of the callee at the past location of the caller, and different callees may be present at that location at different times.

As another example, a caller may be a law enforcement agency who might want to call anyone—even an unknown callee—who was at an establishment at a past time, to ask whether the callee saw a wanted person engaged in an unlawful activity then and there. The wanted person is someone other than the caller, the establishment visited in the past by the callee is the past location of part (i), and the callee's co-location with the wanted person at the past time at the establishment is the condition of part (ii). Different callees, with different mobile devices, and with different numbers or identifiers, may be present at the establishment at different times.

These example situations are not intended to be limiting. From this disclosure, those of ordinary skill in the art will be able to conceive many other situations where such calls are desirable and the same are contemplated within the scope of the illustrative embodiments.

The illustrative embodiments recognize that presently available methods of calling are severely limited in establishing a call in these and other similar circumstances. Thus, a solution for calling one or more transient callees or callee-associated mobile devices based on the mobile device's location is needed and will be beneficial.

SUMMARY

The illustrative embodiments provide a method, system, and computer program product for facilitating location-based communication with mobile devices. An embodiment includes a method for facilitating location-based communication with mobile devices. The embodiment receives, at an application executing in a service provider data processing system, an instruction for making a telecommunication call to a location, the location being a place where different callees with different mobile devices are present at different times, and a callee is present with a mobile device at the place at a given time therefore the call is made to the mobile device of the callee in order to call the location. The embodiment detects, using the application, a set of locations corresponding to a set of subscribers. The embodiment identifies, from the set of subscribers, a set of potential callees, wherein each mobile device associated with each callee in the set of potential callees is present at the location at the given time. The embodiment establishes, using the application, the telecommunication call between a device of a caller and the mobile devices associated with a subset of potential callees, the subset of potential callees including the callee. Thus, the embodiment allows connecting a caller to a callee, from a dynamic group of callees, by only knowing a location, where no identifier may be statically associated with the location.

Another embodiment further transmits, responsive to all potential callees permitting the transmitting, the set of potential callees to the device of the caller. The embodiment receives a selection from the device of the caller, the selection identifying the subset of potential callees. Thus, even though the callees may be unknown to the caller and transient at the location, the embodiment allows the caller to apply some selection criteria in connecting with those callees.

Another embodiment further prevents transmitting, as a part of transmitting the set of potential callees, an identifying information of any potential callee in the set of potential callees to the caller. The embodiment further prevents transmitting, as a part of transmitting the set of potential callees, an identifier of any mobile device of any potential callee in the set of potential callees to the caller. Thus, the embodiment allows connecting a caller to an unknown callee having a device with an unknown identifier, while preserving the callee's privacy.

Another embodiment further determines an identifier of a particular mobile device of a particular potential callee in the subset of potential callees only by using a location of the particular mobile device at the given time. Thus, the embodiment allows connecting a caller to an unknown callee having a device with an unknown identifier, only by virtue of the callee's presence at the given location.

In another embodiment the mobile device has an associated identifier, and wherein the callee, the mobile device, and the identifier change at the location at a second time. Thus, the embodiment allows connecting a caller to a transient callee who is present at the given location only for a period.

Another embodiment further determines, responsive to the instruction including a condition that must be satisfied by the callee, whether the condition specifies the location. The embodiment computes, using the application, responsive to the condition not specifying the location, the location from the condition. Thus, the embodiment allows connecting a caller to a callee where the callee is unknown, the callee's device's identifier is unknown, and the callee's location is also unknown, but the callee satisfies some condition from which a location where the callee is present can be determined and the caller and callee can be connected via a telecommunication channel.

Another embodiment further determines, responsive to the instruction including a condition that must be satisfied by the callee, whether the condition can be evaluated at the application in the service provider data processing system. The embodiment determines, responsive to determining that the condition can be evaluated at the application, whether a particular potential callee in the subset of potential callees satisfies the condition. The embodiment removes, responsive to the particular potential callee in the subset of potential callees failing to satisfy the condition, the particular potential callee from the set of potential callees. Thus, the embodiment allows a service provider system to determine the suitability of a callee for connecting a caller to the unknown callee.

Another embodiment further determines, responsive to the instruction including a condition that must be satisfied by the callee, whether the condition can be evaluated at the application in the service provider data processing system. The embodiment configures, responsive to determining that the condition cannot be evaluated at the application, the condition for sending to a mobile device of a potential callee in the subset of potential callees prior to establishing the telecommunication call with the potential callee. Thus, the embodiment allows a service provider system to use a callee's mobile device to determine the suitability of the callee for connecting a caller to the unknown callee.

Another embodiment further obtains, at the application, a set of present locations of a set of mobile devices. The embodiment determines, at the application, that a subset of the mobile devices will move from their respective present locations to the location by the given time. The embodiment selects, by the application at the service provider data processing system, callees associated with the subset of the mobile devices as the set of potential callees. Thus, the embodiment allows connecting a caller to a callee where the callee's travel trajectory is likely to place the callee at the location at the given time.

In another embodiment a present location of an obfuscated mobile device is configured to be determinable incorrectly as a second present location. The embodiment omits, at the application in the server provider's data processing system, the obfuscated mobile device from inclusion in the subset of mobile devices. Thus, the embodiment allows a callee to avoid location calls by allowing the callee to alter the callee's device's location causing the device to disappear from a location, or appear at a location different from the device's actual location, by masquerading, changing, or hiding the device's location information.

In another embodiment a present location of a masquerading mobile device is configured to be determinable incorrectly as a set of different locations. The embodiment concludes, by the application at the service provider, that a different location in the set of different locations corresponds to the location. The embodiment includes, responsive to the concluding, at the application in the server provider's data processing system, the masquerading mobile device in the subset of mobile devices. Thus, the embodiment allows a callee to avoid location calls by allowing the callee to alter the callee's device's location causing the device to appear to be present at one or more locations that are different from the device's actual location.

Another embodiment includes a computer usable program product comprising a computer readable storage device including computer usable code for facilitating location-based communication with mobile devices. Thus, the embodiment creates a software product that is usable for configuring a service provider's system for facilitating location calls.

Another embodiment includes a data processing system for facilitating location-based communication with mobile devices. Thus, the embodiment creates a service provider's system for facilitating location calls.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
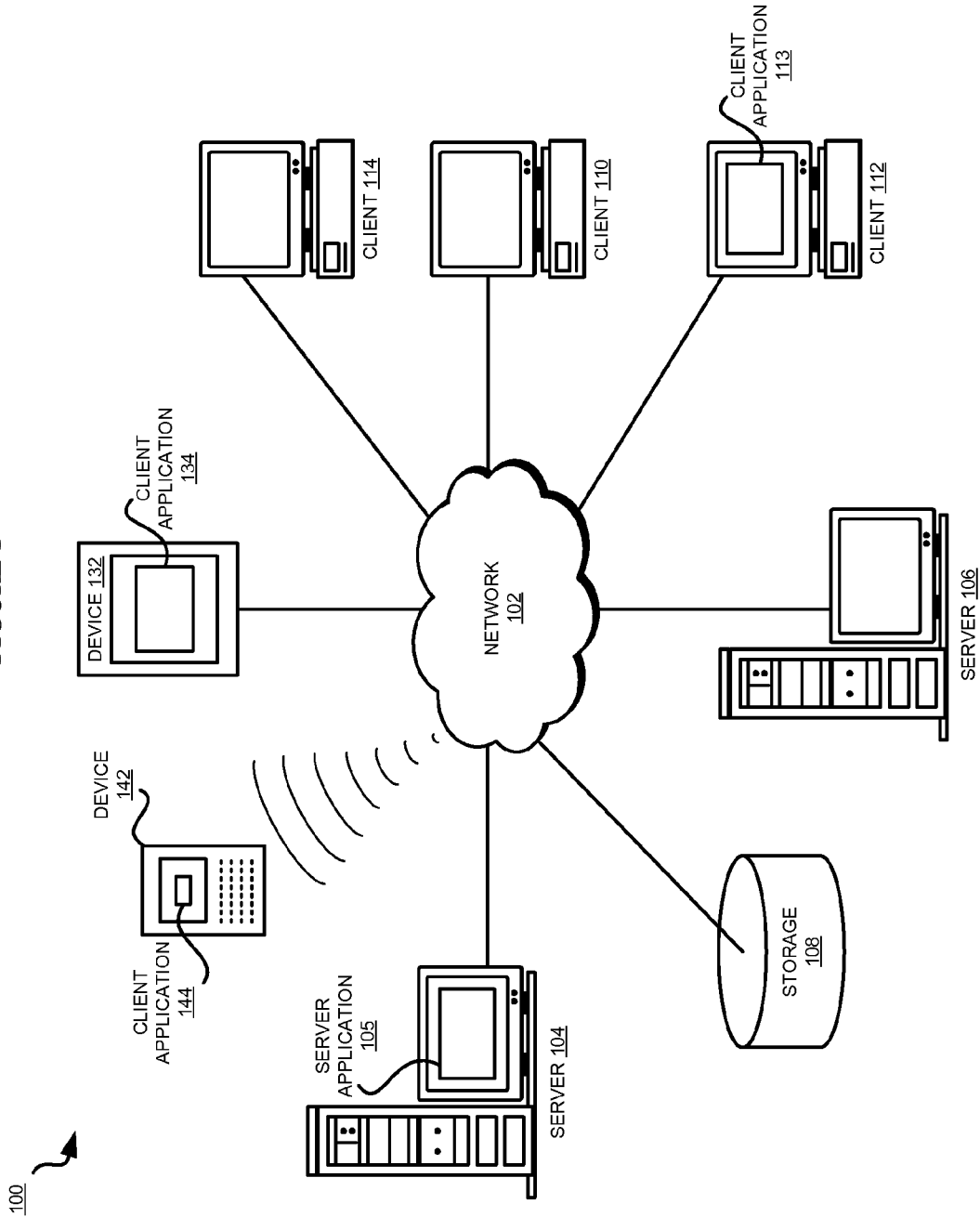
FIG. 1 depicts a block diagram of a network of data processing systems in which illustrative embodiments may be implemented.

The illustrative embodiments used to describe the invention generally address and solve the above-described problems and other problems related to calling one or more transient and unknown callees based on the callees' location. The illustrative embodiments provide a method, system, and computer program product for facilitating location-based communication with mobile devices.

Within the scope of the illustrative embodiments, a location call is a call placed by one caller to one or more transient and unknown callees based on the callees' location. From the caller's perspective, the location call is an outbound location call. From a callee's perspective, the location call is an inbound location call.

Within the scope of the illustrative embodiments, a location includes a precisely specified geographical point, a description of a structure or landmark located in a geographical region, a defined and bound geographical area, a geographical point or area that meets a criterion or condition, or some combination thereof.

As can be seen from the example situations or use cases presented in this disclosure, a location of a location call may be specified or deducible from a location-related condition. The location may be a past location, a present location, or a future location. The location may be a location of the caller, the potential callee, or both. Additionally, the location-related condition may optionally include a callee condition. A callee condition is a condition that the callee has to satisfy by the callee's presence at a place, callee's time of presence at a place, callee's personal state, information about the callee, or some combination thereof. A callee personal state can include but is not limited to a role of the callee, a privilege or restriction of the callee, a membership of the callee, an authority of the callee, a physical condition of the callee, a condition of the callee relative to another person or thing, and generally a condition which has to be resolved using information available to the callee.

An example location-related condition may include one or more specified locations, one or more conditions from which to deduce a location, or some combination thereof. Another example location-related condition may include one or more callee conditions, and a callee condition may be usable for determining or deducing a location. Another example location-related condition may include one or more specified locations, one or more conditions from which to deduce a location, one or more callee conditions, or some combination thereof. Any number of location-related conditions, callee conditions, or some combination thereof, may apply to a particular call to a location.

A client-application can be implemented as an application to execute on a mobile device. One implementation of the client-application enables a caller to place an outbound location call. Another implementation of the client-application enables a callee to respond to, accept, or otherwise handle an incoming location call. Another implementation of the client-application is configured to facilitate features described with respect to both outbound location calls and inbound location calls at a client, to with, a mobile device of an individual who may be a caller for one call and a callee for another call.

An embodiment is configured to facilitate features described with respect to both outbound location calls and inbound location calls at a service provider's system. For example, such an embodiment can be implemented as an application executing on a server data processing system or a comparable data processing system in a network operated or used by a service provider of telecommunication services to mobile devices.

An implementation of the client-application detects that the caller wishes to initiate a location call. For example, a caller selecting an area or a location on a map application triggers the detection that the caller wishes to initiate a location call. As another example, a caller inputting a description of an area or a location, such as via a natural language interface, triggers the detection that the caller wishes to initiate a location call. As another example, a caller selecting or highlighting a description of an area or a location, such as on a calendar application, triggers the detection that the caller wishes to initiate a location call.

A caller can configure a number of criteria or conditions for the outbound location call. Any number or type of these criteria can be sent to an embodiment implemented in a server-application. For example, the caller can specify when the potential callees should be present or have been present at the location. As another example, the caller can specify how many potential callees should be present at the location. As another example, the caller can specify how many potential callees should respond to the location call. As another example, the caller can specify a timeout period within which a potential callee should respond; otherwise the location call should be terminated. As another example, the caller can specify the request the caller has for a callee who answers the location call, e.g., a text message that should be presented to the callee who accepts the location call. As another example, the caller can specify who should not be at the location in order for the call to be completed. As another example, the caller can specify callee conditions that must be satisfied, e.g., the callee should be present at the meeting but not currently projecting on the screen. These examples of caller-specified conditions are not intended to be limiting on the illustrative embodiments. From this disclosure, those of ordinary skill in the art will be able to conceive many other similarly purposed conditions, and any number or type of these criteria can be sent to a server-application by including in one or more location-related conditions within the scope of the illustrative embodiments.

An embodiment executes as a server-application in a server at a service provider whose network will be utilized for the call. The embodiment receives from a client-application one or more location-related conditions. The embodiment identifies one or more mobile devices that are, were, will likely be, or will be, situated at the specified or deduced location and time according to a location-related condition.

As some non-limiting examples, an embodiment establishes a callee's mobile device's geographical location by receiving from the mobile device its Global Positioning system (GPS) coordinates, by triangulating the mobile device's position from the cellular or wireless network base stations, or by detecting proximity to a wireless networking beacon or access point which is itself in a known location. An embodiment further computes a trajectory of the mobile device using a history of locations to which the mobile device has traveled in the past. Using the past traversals of the mobile device and using the mobile device's location and velocity at a particular time, an embodiment extrapolates a future location of the mobile device.

An embodiment prepares a callee list. The callee list includes the identified mobile devices and their associated identifiers or numbers. Each callee associated with an identified mobile device is a potential callee. When an embodiment at a server application does not have the location information of a mobile device, the server application does not include the mobile device in a callee list.

A server application according to one embodiment provides the callee list to a client-application executing on the caller's device. In such an embodiment, an identity of a potential callee, an identifier or number of a potential callee's mobile device, a normalized form of the identity or identifier, or some combination thereof, are revealed to the caller.

A server application according to another embodiment does not provide the callee list to the client-application executing on the caller's device. In such an embodiment, an identity of a potential callee, an identifier or number of a potential callee's mobile device, or some combination thereof, are not revealed to the caller, thereby preserving the callees' privacy from the caller. Such an embodiment is particularly useful for features such as anonymous polling of callees and other features where anonymous participation of the callees is desirable.

An embodiment receives an instruction from a client-application to initiate the location call. For example, one example instruction identifies one or more selected callees from a callee list, when an embodiment provides a callee list to the client-application, and the client-application makes such a selection. Another example instruction includes any data, such as a text message, that the caller has configured at a client-application, to provide to a callee who accepts the location call.

An embodiment initiates the location call using the instructions. Optionally, if an instruction has provided any data to be transmitted to a callee, an embodiment passes such data to each callee mobile device with which the location call is initiated.

An embodiment supports server-side inbound location call configuration for a callee. A user who could be a potential callee for a future location call can use a client-application to configure one or more preferences for the handling of such future location calls. For example, a user can configure the embodiment with a black zone. A black zone is a location or area where the user does not want to participate in one or more location calls.

The user can further configure specific properties of the location calls in which the user does not want to participate while the user's mobile device is located in the black zone. A user can also configure a time period when the user does not want to participate in location calls while in the black zone. A user can also configure a time period, i.e., a Do Not Disturb (DND) period, when the user does not participate in location calls regardless of where the user is located. A user can also configure a whitelist (or a blacklist) of potential caller's, from any of whom a location call is acceptable (not acceptable).

The user can further configure specific properties of the location calls in which the user wants to masquerade their location to be broader than, different from, or narrower than their current location, or some combination thereof. As an example, such configuration can permit a callee at one location to receive location calls intended for that location and/or other locations.

An embodiment provides server-side management of a callee's inbound location call preferences. In such an embodiment, a server application accepts these and other similar configuration parameters and other callee preferences from a client-application executing in the callee's mobile device. These examples of callee configurations are not intended to be limiting. From this disclosure, those of ordinary skill in the art will be able to conceive many other configuration parameters that can be configured in a similar manner, and the same are contemplated within the scope of the illustrative embodiments. During server-side management of callee's preferences, an embodiment allows or prevents the inclusion of the callee's mobile device in a list of potential callees.

After a callee accepts a location call, an embodiment further manages the ongoing call. For example, a callee may respond to the caller with data that may be requested from the callee. For example, the callee can capture and transmit an image of a surrounding where the callee's mobile device is present. As another example, the callee can transmit a message or a disclaimer to the caller before the callee and the caller communicate in the call. An embodiment operating in a server-application facilitates the exchange of these and other similarly purposed data transmissions at the beginning of the location call, during the location call, prior to a termination of the location call, or even after a location call has terminated.

A method of an embodiment described herein, when implemented to execute on a device or data processing system, comprises substantial advancement of the functionality of that device or data processing system in calling a mobile device based on the device's location. For example, prior-art requires that a caller be able to identify a callee either by an identity of the callee or by a fixed association of a telecommunication identifier, e.g., a phone number, with a location. An embodiment enables a caller to make a location call without knowing the identity of a callee at a location, without the location being associated with any particular telecommunication identifier, or both. Operating in a manner described herein, an embodiment allows a service provider to facilitate location-based communication with mobile devices. Such manner of operating a telecommunication system is unavailable in presently available devices or data processing systems. Thus, a substantial advancement of such devices or data processing systems by executing a method of an embodiment facilitates calls to a transient and dynamic set of callees based on a location and other conditions of the set of callees.

The illustrative embodiments are described with respect to certain applications, circumstances, locations, areas, location-related conditions, callee conditions, configurations and parameters, time periods, transmissions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
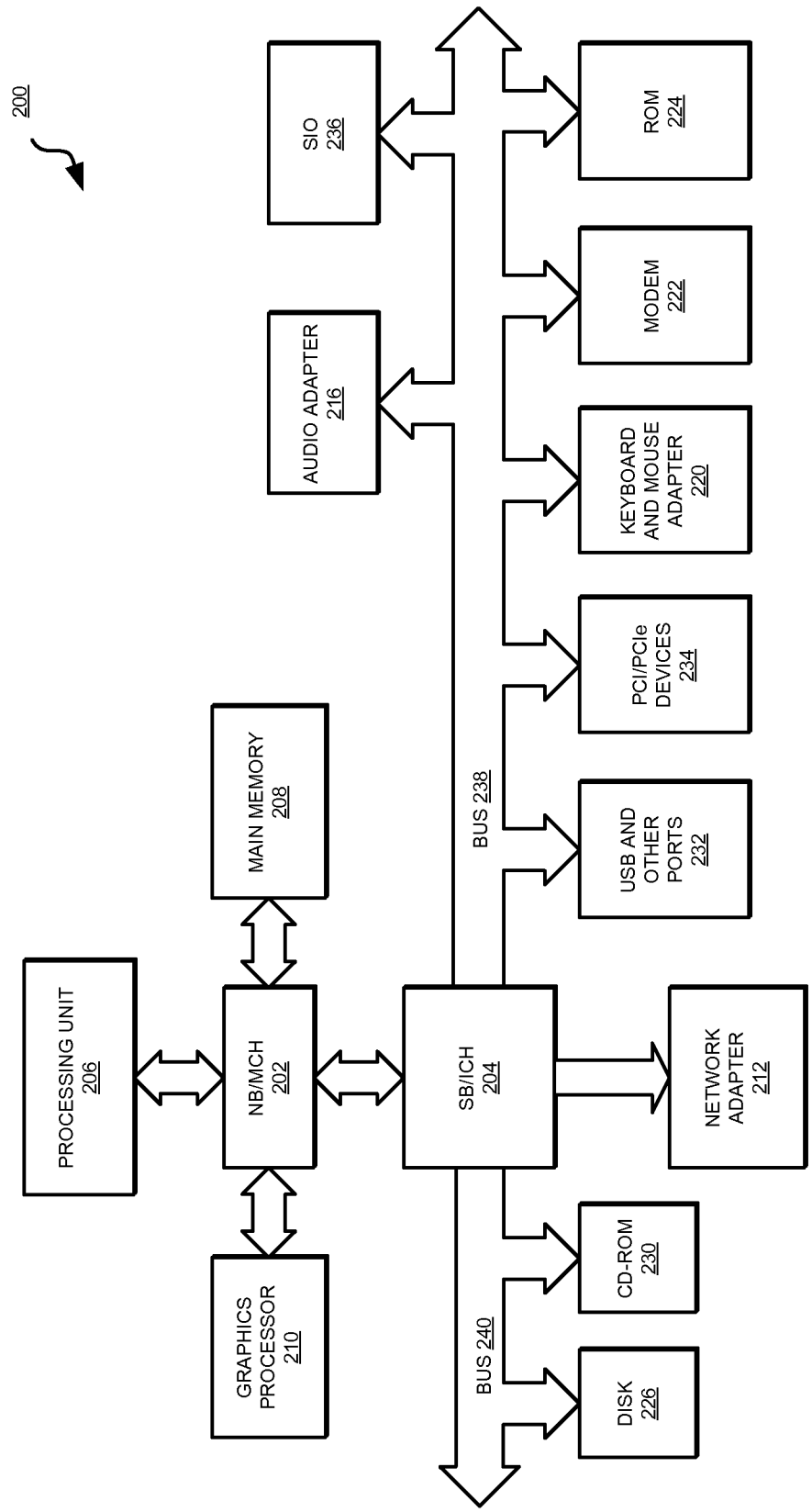
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired communication links, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Device 132 is a mobile device according to an embodiment, e.g., a tablet computer. Device 142 is another example of a mobile device, such as a smartphone. Client 112 is an example of a telecommunication device, including but not limited to a mobile device. Client applications 113, 134, and 144 each implements a client-application described herein. As a non-limiting example, client application 134 may implement certain callee oriented features described herein. As another non-limiting example, client application 144 may implement certain caller oriented features and certain callee oriented features described herein. As another non-limiting example, client application 113 may implement certain caller oriented features described herein. Server-application 105 is an application that executes on the server-side of a service provider's network and implements one or more embodiments described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 and 142 in FIG. 1 in which computer usable program code or instructions implementing the processes of the illustrative embodiments may be located. Data processing system 200 is described as a computer only as an example, without being limited thereto. Implementations in the form of other devices, such as device 132 and 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 105 in FIG. 1 and client applications 113, 134, and 144 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
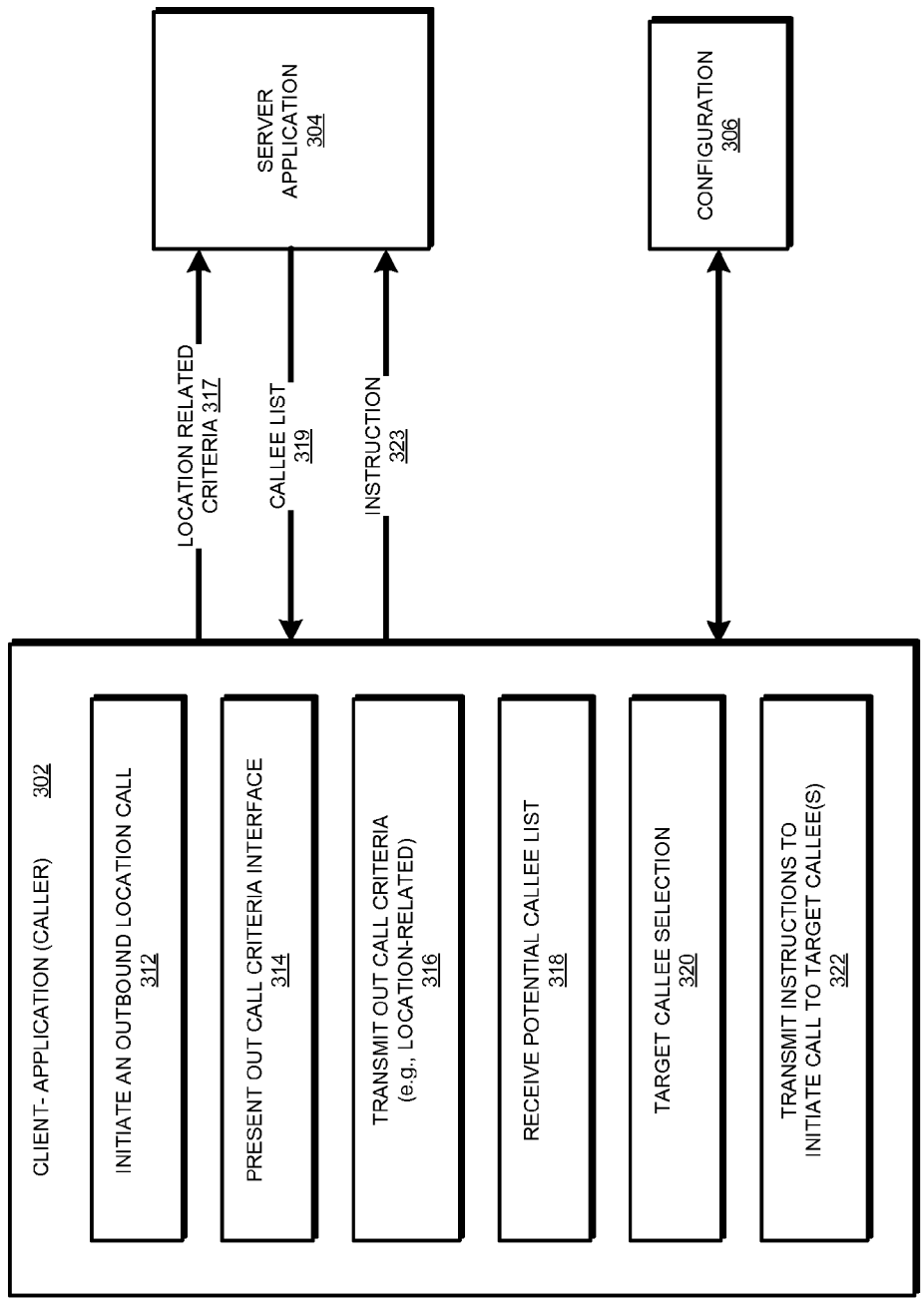
FIG. 3 depicts a block diagram of example client-side caller oriented features for facilitating location-based communication with mobile devices in accordance with an illustrative embodiment.

With reference to FIG. 3, this figure depicts a block diagram of example client-side caller oriented features for facilitating location-based communication with mobile devices in accordance with an illustrative embodiment. Application 302 is an example of any of client applications 134, 144, or 113 in FIG. 1. Server application 304 is an example of server application 105 in FIG. 1.

Component 312 detects that a caller is initiating a location call. Component 314 presents an outbound call criteria selection interface. Any parameters of one or more location-related conditions can be specified using the interface presented by component 314. Component 316 transmits the one or more location-related conditions (317) to server application 304. Optionally, as described elsewhere in this disclosure, server application 304 may send callee list 319 to application 302.

When callee list 319 is available to application 302, component 318 receives callee list 319 from server application 304. In some cases, component 318 may prepare and send a request to server application 304 for callee list 319.

Component 320 enables the caller to select one or more potential callees from callee list 319. Component 322 prepares an instruction to initiate the outbound location call.

Figure 4:
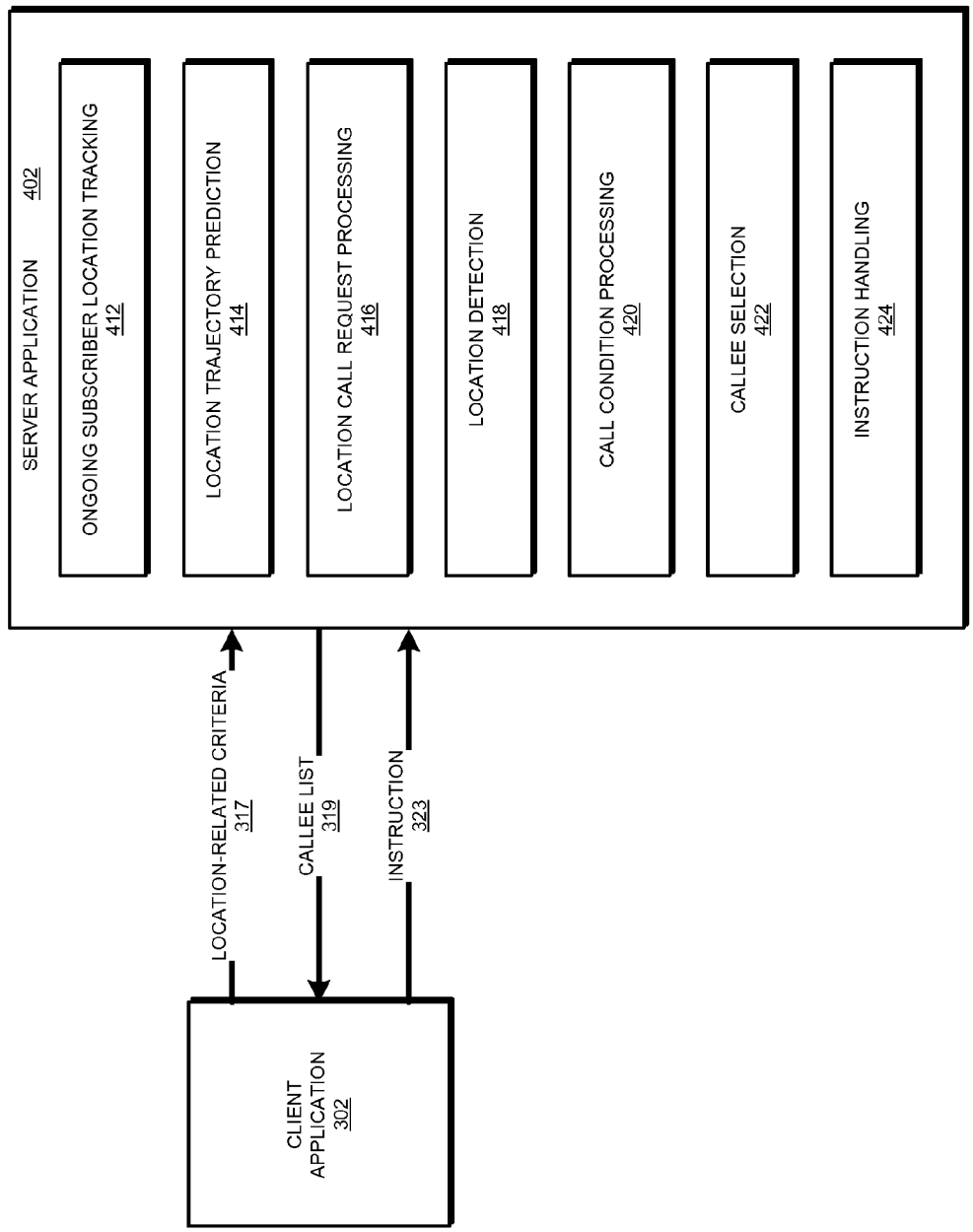
FIG. 4 depicts a block diagram of example server-side features for facilitating location-based communication with mobile devices in accordance with an illustrative embodiment.

With reference to FIG. 4, this figure depicts a block diagram of example server-side features for facilitating location-based communication with mobile devices in accordance with an illustrative embodiment. Client-application 302, location-related criteria 317, callee list 319, and instruction 323 are the same as in FIG. 3. Server application 402 is an example of server application 304 in FIG. 3, and implements an embodiment described herein.

Component 412 receives location information about the locations and movements of the mobile devices of various subscribers of the service provider. This ongoing tracking of subscriber locations is stored in a historical record of subscriber locations. Such a record is useful in selecting a subscriber as a potential callee for a location call when location-based criterion 317 includes a condition that is based on a past location of the callee.

Some callees may prefer not to allow ongoing location tracking. When a callee's mobile device does not provide location information, such as for privacy reasons, component 412 passes, or configures for passing, location criteria 317 or a portion thereof to the callee's mobile device (not shown). The callee's mobile device evaluates location-related criteria 317 or the portion thereof, and either provides a location or another response. Some non-limiting examples of the other response include an affirmative response with no location information, a negative response, a lack of a response, or a refusal of the location information. For example, an affirmative response indicates a match to the specified location criteria. A negative response may be due to the location criteria not matching the device's location. A lack or a response may be because the callee and/or the callee's mobile device do not want to directly or indirectly divulge any location information by answering in the affirmative.

When the callee's mobile device provides a location in response to location-related criteria 317 or a portion thereof, component 412 records such location of the mobile device. When the callee's mobile device does not provide a location, component 412 does not create a record of that device's location. Such an operation permits callee devices to maintain privacy of their past, present, or future location data.

Component 414 predicts or extrapolates a subscriber's trajectory to determine a possible future location of the subscriber. Such a prediction is useful in selecting a subscriber as a potential callee for a location call when location-based criterion 317 includes a condition that is based on a future location of the callee.

Component 416 processes location-related criteria 317 to determine the caller's requirements for a location call. For example, component 416 determines whether the caller requires a callee condition to be satisfied; whether a condition has to be satisfied by the callee at a particular location, time, or both; whether more than one callees have to respond; whether the location call has to be automatically terminated if less than a threshold number of callees accept the location call; and many other caller-configured call parameters, as described via some non-limiting examples herein.

Component 418 detects, determines, or deduces a location for the location call according to location-related criteria 317. In some cases, component 418 extracts a specified location for the location call from location-related criterion 317. In some other cases, component 418 deduces a location for the location call from location-related criterion 317.

Component 420 analyzes location-related criteria 317 to determine whether a condition in location-related criteria 317 has to be processed on server application 402. For example, one location-related criterion 317 may specify that a subscriber should be selected as a potential callee only if the subscriber is stationary at a location and time. Whether a subscriber is stationary at the location and time can be determined at server-application 402 by using the location tracking data produced by component 412. Accordingly, component 420 causes such a condition to be processed at server-application 402.

Generally, component 420 identifies whether a condition in location-related criteria 317 has to be processed on server application 402 and processes the condition. When a condition in location-related criteria 317 has to be processed on a callee's client-application, component 420 passes, or configures for passing, the condition to a callee's mobile device. The passing of the condition to the callee's mobile device causes the callee's mobile device to evaluate and respond to the condition.

Component 422 selects one or more callees as potential callees for callee list 319. In one non-limiting example operation, component 412 records the locations of the various subscribers, component 418 determines a location of the location call, component 420 processes a condition that a callee has to satisfy at the location, enabling component 422 to select one or more such callees from a set of subscribers.

Component 424 determines a nature of instruction 323, when instruction 323 is available from client-application 302. If the instruction is for server-application 402, such as to include or not include certain subscribers/callees, component 424 processes such instructions to assist an operation of component 422. If the instruction is for a callee, component 424 passes, or configures for passing, the condition to a callee's mobile device. The passing of the condition to the callee's mobile device causes the callee's mobile device to evaluate and respond to the condition.

Figure 5:
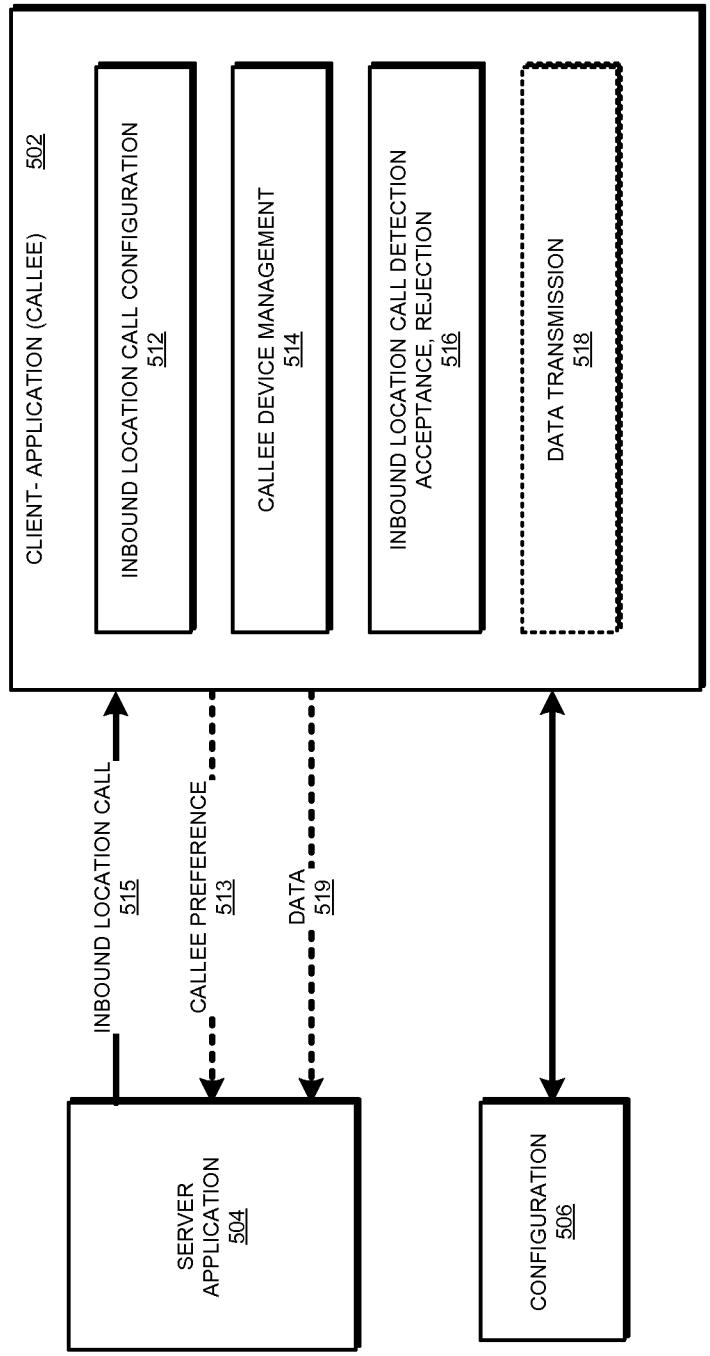
FIG. 5 depicts a block diagram of example client-side callee oriented features for facilitating location-based communication with mobile devices in accordance with an illustrative embodiment.

With reference to FIG. 5, this figure depicts a block diagram of example client-side callee oriented features for facilitating location-based communication with mobile devices in accordance with an illustrative embodiment. Application 502 is an example of any of client applications 134, 144, or 113 in FIG. 1. Application 502 can also be implemented together with the features of application 302 in FIG. 3, in the form of a single application. Server application 504 is an example of server application 402 in FIG. 4.

Component 512 allows a potential callee to configure application 502, the mobile device where application 502 is executing, or both, according to a preference of the callee for handling an inbound location call. A configuration preference provided by the callee is saved in configuration 506. Component 512 may also present to the callee a parameter from configuration 506 as a default configuration or a previously saved preference of the callee. Component 512 may also alter a callee preference based on a time, a location of the callee's device, or a combination thereof, and update configuration 506 accordingly. Optionally, component 512 may send (513) one or more preferences to server application 504.

Component 514 configures the mobile device where application 502 is executing. Particularly, component 514 configures the mobile device to observe or enforce a black zone, DND and other periods, location hiding, location obfuscation or masquerading, and other device configurations described herein.

Server application 504 sends inbound location call 515, or an indication thereof, to application 502. For example, inbound location call 515 may result from instruction 323 sent from application 302 to server-application 402 in FIG. 4.

Component 516 detects inbound location call 515. Component 516 accepts, rejects, or allows a failure, of call 515 according to callee preferences in configuration 506. Optionally, when data is requested by a caller or server application 504, as described elsewhere in this disclosure, component 518 sends data 518 to server application 504.

Figure 6:
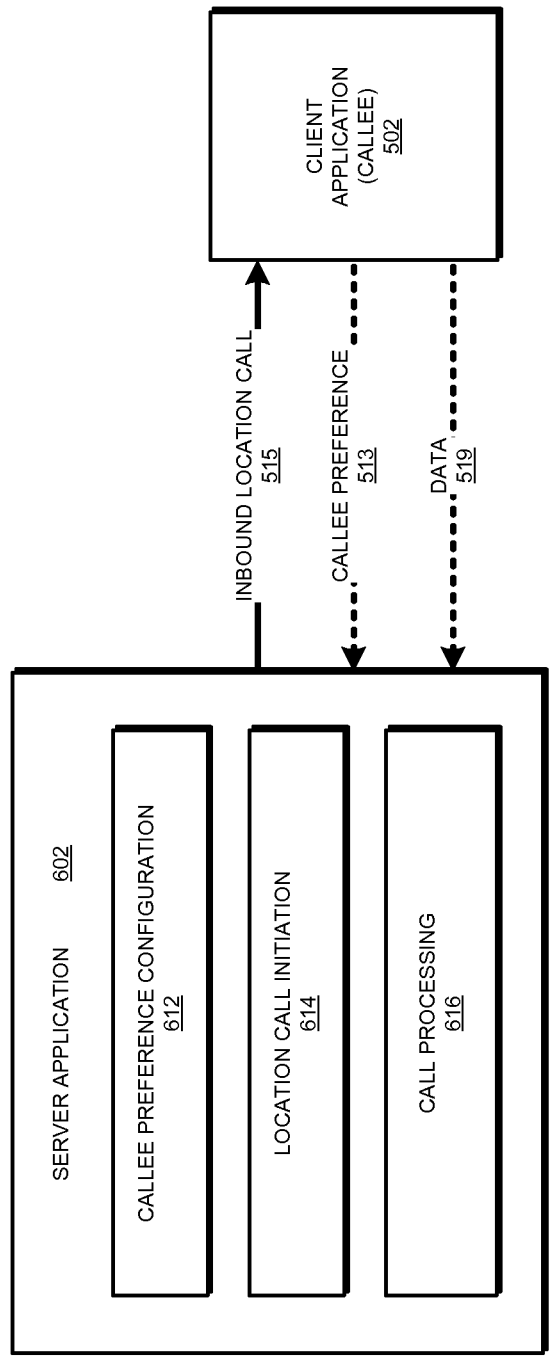
FIG. 6 depicts a block diagram of additional example server-side features for facilitating location-based communication with mobile devices in accordance with an illustrative embodiment.

With reference to FIG. 6, this figure depicts a block diagram of additional example server-side features for facilitating location-based communication with mobile devices in accordance with an illustrative embodiment. Client-application 502, inbound location call 515, callee preference 513, and data 519 are the same as in FIG. 5. Server application 602 is an example of server application 504 in FIG. 5, and implements an embodiment described herein.

Component 612 manages a callee's preferences on the server-side. For example, if 502 client-application sends preference 513 to server application 602, component 612 saves that preference in a subscriber's profile (not shown) associated with the callee. As an example, a subscriber may prefer that server application 602 not send inbound location call 515 to client-application 502 where the inbound location call meets, or fails to meet, a callee-specified condition. In another example, a subscriber may prefer to have their location be considered to be different from or augmented from their past, present, or future location. Some example callee-specified conditions may be to avoid location calls that originate from overseas, avoid location calls whose instructions include taking pictures at the location, avoid location calls where the caller requests or receives a callee list, accept location calls from a designated group of callers, accept location calls when the subscriber/callee's account balance has a credit, and the like.

Component 614 initiates the location call to one or more callees identified by component 422 in FIG. 4. Component 616 processes the ongoing call between a caller and a callee. For example, component 616 receives data 519 from client-application 502 and passes the data to the client-application of the caller with or without applying any processing to the data.

As an example, component 616 may process data 519 before passing the data to the caller by normalizing or redacting information from data 519 that can identify the callee or callee's device. As another example, component 616 may process data 519 before passing the data to the caller by encrypting data 519, decrypting data 519, or decrypting and differently encrypting data 519 before passing the data to the caller.

Figure 7A:
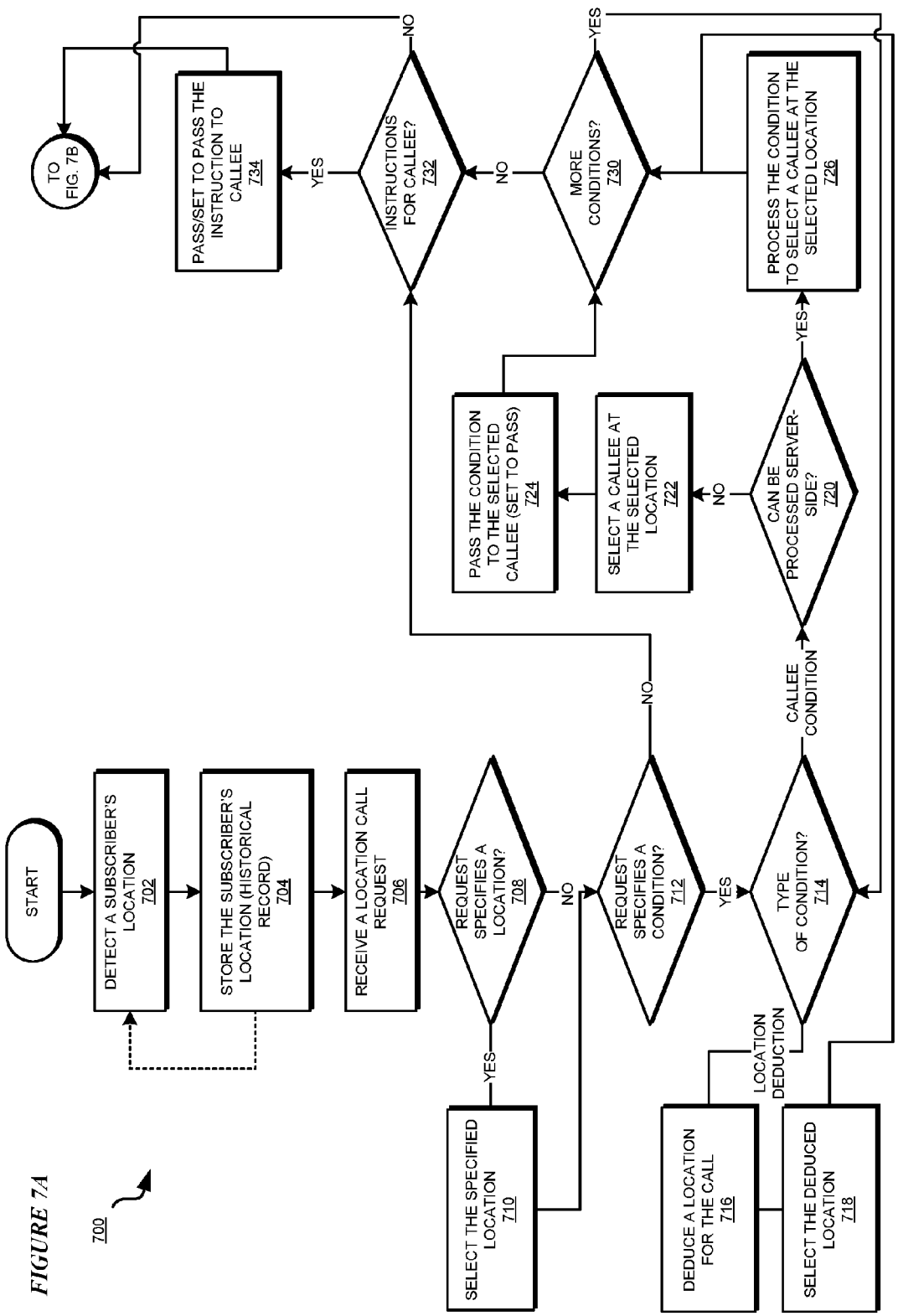
FIG. 7A and FIG. 7B together depict a flowchart of an example process for facilitating location-based communication with mobile devices in accordance with an illustrative embodiment.
Figure 7B:
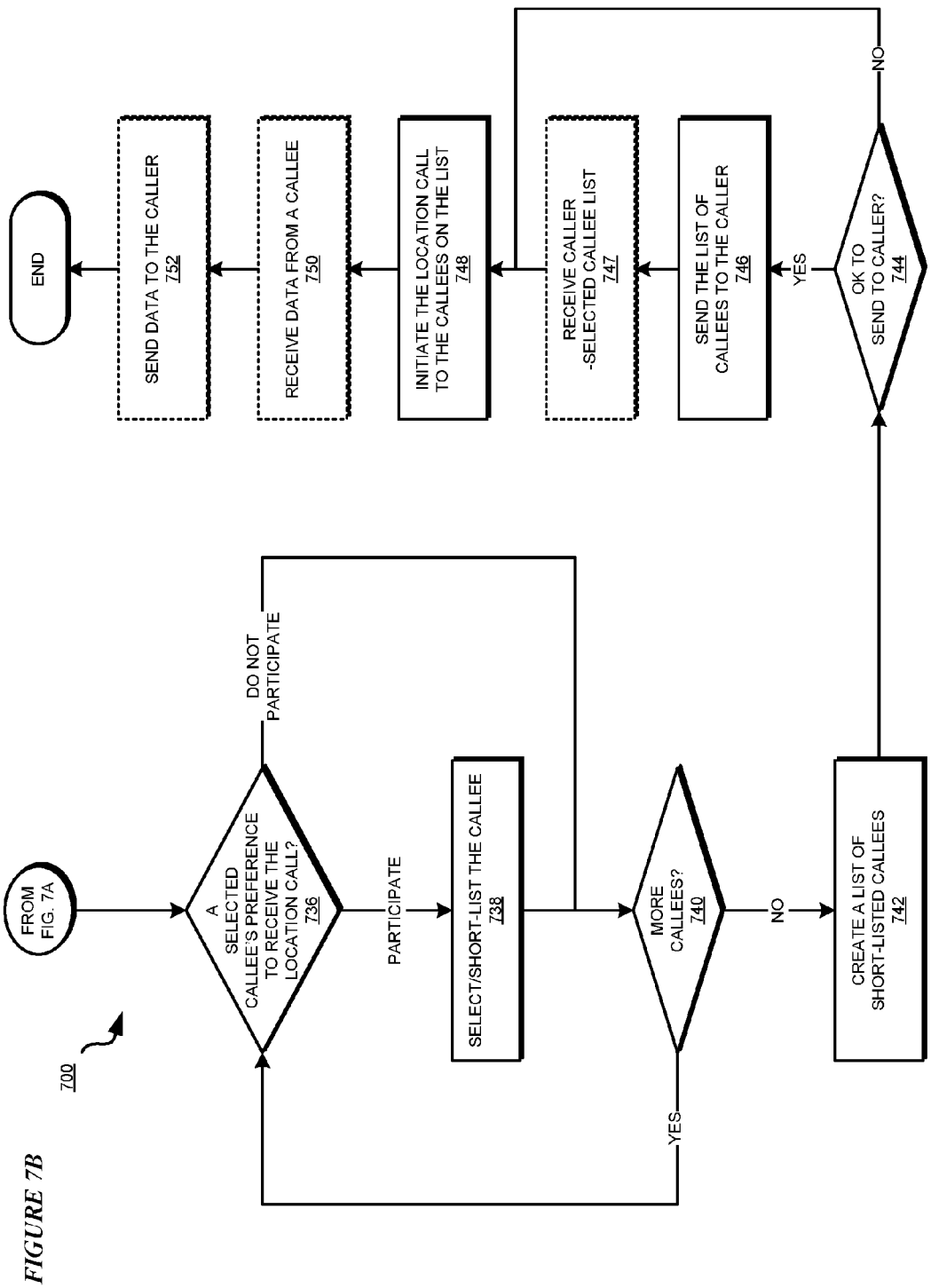

With reference to FIG. 7A and FIG. 7B, these figures together depict a flowchart of an example process for facilitating location-based communication with mobile devices in accordance with an illustrative embodiment. Process 700 can be implemented in server application 602 in FIG. 6. FIGS. 7A and 7B are connected as shown.

In part 1 of process 700, depicted as FIG. 7A, the application detects a subscriber's location (block 702). The application stores the subscriber's location in a repository of historical location data (block 704). The application repeats blocks 702 and 704 for a period and for one or more subscribers. In one embodiment, blocks 702 and 704 are optional.

The application receives a location call request, such as in the form of a location-related criterion from a caller's mobile device (block 706). In order for the location call request to be valid, the request must specify a location, a condition, or both. The application determines whether the request specifies a location for the location call (block 708). If the request specifies a location for the location call ("Yes" path of block 708), the application selects the specified location (block 710). If request does not specify a location for the location call ("No" path of block 708), the application determines whether the request specifies a condition (block 712).

If the request does not specify a condition ("No" path of block 712), the application proceeds to block 732. If the request specifies a condition ("Yes" path of block 712), the application determines a type of the condition (block 714).

If the type of the condition is such that the condition is to be used for deducing a location for the location call ("Location deduction" path of block 714), the application deduces from the condition a location for the location call (block 716). The application selects the deduced location as the location for the call (block 718), after which the application checks for more conditions (block 730).

If the type of the condition is such that the condition is to be used as a callee condition ("Callee condition" path of block 714), the application further determines whether the callee condition can be processed on the server-side (block 720). If the callee condition cannot be processed on the server-side ("No" path of block 720), the application selects a callee at the selected location, such as based only on the callee's location and/or time of presence at the location (block 722). The application passes, or configures to pass, the condition to a client-application at the selected callee's mobile device (block 724), after which the application checks for more conditions (block 730).

If the callee condition can be processed on the server-side ("Yes" path of block 720), the application processes the condition to select a callee at the selected location, such as by selecting the callee using the callee's location and/or a time of presence at the location, and ensuring that the callee satisfies the condition (block 726). Proceeding from blocks 718, 724, or 726, the application determines whether more conditions need to be resolved in the request for the location call (block 730).

If more conditions were received in the request for the location call ("Yes" path of block 730), the application returns process 700 to block 714 to analyze and process another condition in a similar manner. If no more conditions were received in the request for the location call ("No" path of block 730), the application determines whether any instructions were received for sending to the callee (block 732). If any instructions were received for sending to the callee ("Yes" path of block 732), the application passes, or configures for passing, the instructions to a client-application at the selected callee's mobile device (block 734). The application continues to part 2 of process 700, depicted as FIG. 7B. In one embodiment process 700 ends after block 734.

In one embodiment, part 2 of process 700, depicted as FIG. 7B can be implemented as a separate process. In part 2 of process 700, depicted as FIG. 7B, the application determines whether a selected callee has set a preference such that the callee would like to receive, or participate in, the location call that is being processed (block 736). If the callee's preference indicates that the callee would like to participate ("Participate" path of block 736), the application selects, or short-lists the callee (block 738). If the callee's preference indicates that the callee would not like to participate ("Do not participate" path of block 736), the application determines if more callees were selected by the operation of blocks 722 or 726 (block 740).

If more callees have been selected ("Yes" path of block 740), the application returns to block 736 to analyze a preference of another selected callee. If no more callees have been selected ("No" path of block 740), the application, the application creates a list of the short-listed callees (block 742).

The application determines whether the callee list can be sent to the caller (block 744). For example, one or more callees on the callee list may have configured a preference that prevents the application from sending the callee's information to the caller.

If the callee list can be sent to the caller ("Yes" path of block 744), the application sends the list of callees prepared in block 742 to the client-application executing in the caller's device (block 746). The application optionally receives a caller-selected callee list, which may include all or some of the callees from the callee list that is sent to the caller in block 746 (block 747). If no such caller-selection is received within a set period, the application proceeds with the callee list sent in block 746.

Thereafter, of if the callee list cannot be sent to the caller ("No" path of block 744), the application initiates the location call to the callees on the callee list (block 748). For example, if the callee list was not sent to the caller, the call is initiated to the callees on the callee list. If the callee list was sent to the caller but the caller did not return a selection of callees from that list, the call is initiated to the callees on the callee list. If the callee list was sent to the caller and the caller returned a selection of callees from that list, the call is initiated to the caller-selected callees from the callee list.

Optionally, the application receives data from one or more callees (block 750). When the data is for the caller, the application sends such optionally received data to the caller (block 752). The application ends process 700 thereafter.

Thus, a computer implemented method, system or apparatus, and computer program product are provided in the illustrative embodiments for facilitating location-based communication with mobile devices. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for facilitating location-based communication with mobile devices, the method comprising:
   receiving, at an application executing in a service provider data processing system, an instruction for making a telecommunication call to a location, the location being a place where different callees with different mobile devices are present at different times, and a callee is present with a mobile device at the place at a given time therefore the call is made to the mobile device of the callee in order to call the location;
   detecting, using the application, a set of locations corresponding to a set of subscribers;
   identifying, from the set of subscribers, a set of potential callees, wherein each mobile device associated with each callee in the set of potential callees is present at the location at the given time; and
   establishing, using the application, the telecommunication call between a device of a caller and the mobile devices associated with a subset of potential callees, the subset of potential callees including the callee.

2. The method of claim 1, further comprising:
   transmitting, responsive to all potential callees permitting the transmitting, the set of potential callees to the device of the caller; and
   receiving a selection from the device of the caller, the selection identifying the subset of potential callees.

3. The method of claim 1, further comprising:
   preventing transmitting, as a part of transmitting the set of potential callees, an identifying information of any potential callee in the set of potential callees to the caller; and
   further preventing transmitting, as a part of transmitting the set of potential callees, an identifier of any mobile device of any potential callee in the set of potential callees to the caller.

4. The method of claim 1, further comprising:
   determining an identifier of a particular mobile device of a particular potential callee in the subset of potential callees only by using a location of the particular mobile device at the given time.

5. The method of claim 1, wherein the mobile device has an associated identifier, and wherein the callee, the mobile device, and the identifier change at the location at a second time.

6. The method of claim 1, further comprising:
   determining, responsive to the instruction including a condition that must be satisfied by the callee, whether the condition specifies the location; and
   computing, using the application, responsive to the condition not specifying the location, the location from the condition.

7. The method of claim 1, further comprising:
   determining, responsive to the instruction including a condition that must be satisfied by the callee, whether the condition can be evaluated at the application in the service provider data processing system;
   determining, responsive to determining that the condition can be evaluated at the application, whether a particular potential callee in the subset of potential callees satisfies the condition; and
   removing, responsive to the particular potential callee in the subset of potential callees failing to satisfy the condition, the particular potential callee from the set of potential callees.

8. The method of claim 1, further comprising:
   determining, responsive to the instruction including a condition that must be satisfied by the callee, whether the condition can be evaluated at the application in the service provider data processing system;
   configuring, responsive to determining that the condition cannot be evaluated at the application, the condition for sending to a mobile device of a potential callee in the subset of potential callees prior to establishing the telecommunication call with the potential callee.

9. The method of claim 1, further comprising:
   obtaining, at the application, a set of present locations of a set of mobile devices;
   determining, at the application, that a subset of the mobile devices will move from their respective present locations to the location by the given time; and
   selecting, by the application at the service provider data processing system, callees associated with the subset of the mobile devices as the set of potential callees.

10. The method of claim 9, wherein a present location of an obfuscated mobile device is configured to be determinable incorrectly as a second present location, further comprising:
    omitting, at the application in the server provider's data processing system, the obfuscated mobile device from inclusion in the subset of mobile devices.

11. The method of claim 9, wherein a present location of a masquerading mobile device is configured to be determinable incorrectly as a set of different locations, further comprising:
    concluding, by the application at the service provider, that a different location in the set of different locations corresponds to the location; and
    including, responsive to the concluding, at the application in the server provider's data processing system, the masquerading mobile device in the subset of mobile devices.

12. A computer usable program product comprising a computer readable storage device including computer usable code for facilitating location-based communication with mobile devices, the computer usable code when executed by a processor cause operations comprising:

receiving, at an application executing in a service provider data processing system, an instruction for making a telecommunication call to a location, the location being a place where different callees with different mobile devices are present at different times, and a callee is present with a mobile device at the place at a given time therefore the call is made to the mobile device of the callee in order to call the location;

detecting, using the application, a set of locations corresponding to a set of subscribers;

identifying, from the set of subscribers, a set of potential callees, wherein each mobile device associated with each callee in the set of potential callees is present at the location at the given time; and establishing, using the application, the telecommunication call between a device of a caller and the mobile devices associated with a subset of potential callees, the subset of potential callees including the callee.

13. The computer usable program product of claim 12, the operations further comprising:

transmitting, responsive to all potential callees permitting the transmitting, the set of potential callees to the device of the caller; and receiving a selection from the device of the caller, the selection identifying the subset of potential callees.

14. The computer usable program product of claim 12, the operations further comprising:

preventing transmitting, as a part of transmitting the set of potential callees, an identifying information of any potential callee in the set of potential callees to the caller; and further preventing transmitting, as a part of transmitting the set of potential callees, an identifier of any mobile device of any potential callee in the set of potential callees to the caller.

15. The computer usable program product of claim 12, the operations further comprising:

determining an identifier of a particular mobile device of a particular potential callee in the subset of potential callees only by using a location of the particular mobile device at the given time.

16. The computer usable program product of claim 12, wherein the mobile device has an associated identifier, and wherein the callee, the mobile device, and the identifier change at the location at a second time.

17. The computer usable program product of claim 12, the operations further comprising:

determining, responsive to the instruction including a condition that must be satisfied by the callee, whether the condition specifies the location; and computing, using the application, responsive to the condition not specifying the location, the location from the condition.

18. The computer usable program product of claim 12, wherein the computer usable code is stored in a computer readable storage device in a data processing system, and wherein the computer usable code is transferred over a network from a remote data processing system.

19. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

20. A data processing system for facilitating location-based communication with mobile devices, the data processing system comprising:

a storage device, wherein the storage device stores computer usable program code; and a processor, wherein the processor executes the computer usable program code, and wherein the computer usable program code comprises:

computer usable code for receiving, at an application executing in a service provider data processing system, an instruction for making a telecommunication call to a location, the location being a place where different callees with different mobile devices are present at different times, and a callee is present with a mobile device at the place at a given time therefore the call is made to the mobile device of the callee in order to call the location;

computer usable code for detecting, using the application, a set of locations corresponding to a set of subscribers;

computer usable code for identifying, from the set of subscribers, a set of potential callees, wherein each mobile device associated with each callee in the set of potential callees is present at the location at the given time; and computer usable code for establishing, using the application, the telecommunication call between a device of a caller and the mobile devices associated with a subset of potential callees, the subset of potential callees including the callee.

* * * * *